(12) United States Patent
Post

(10) Patent No.: US 10,595,690 B2
(45) Date of Patent: Mar. 24, 2020

(54) CLEANING APPARATUS

(71) Applicant: Kenneth Post, West Bloomfield, MI (US)

(72) Inventor: Kenneth Post, West Bloomfield, MI (US)

( * ) Notice: Subject to any disclaimer, the term of this patent is extended or adjusted under 35 U.S.C. 154(b) by 498 days.

(21) Appl. No.: 15/222,227

(22) Filed: Jul. 28, 2016

(65) Prior Publication Data

US 2016/0332604 A1 Nov. 17, 2016

Related U.S. Application Data

(63) Continuation of application No. 14/216,563, filed on Mar. 17, 2014, now Pat. No. 9,402,515.

(60) Provisional application No. 61/792,262, filed on Mar. 15, 2013, provisional application No. 61/879,819, filed on Sep. 19, 2013, provisional application No. 61/896,734, filed on Oct. 29, 2013.

(51) Int. Cl.
| | |
|---|---|
| A47L 1/15 | (2006.01) |
| A47L 1/06 | (2006.01) |
| A47L 13/16 | (2006.01) |
| A47L 13/256 | (2006.01) |
| A47L 13/20 | (2006.01) |
| A47L 13/254 | (2006.01) |
| B60S 3/04 | (2006.01) |

(52) U.S. Cl.
CPC . *A47L 1/15* (2013.01); *A47L 1/06* (2013.01); *A47L 13/16* (2013.01); *A47L 13/20* (2013.01); *A47L 13/254* (2013.01); *A47L 13/256* (2013.01); *B60S 3/045* (2013.01)

(58) Field of Classification Search
CPC . A47L 1/06; A47L 1/15; A47L 13/254; A47L 13/256; A47L 13/257
USPC ...................... 15/220.1, 231, 232, 147.2, 228
See application file for complete search history.

(56) References Cited

U.S. PATENT DOCUMENTS

| | | |
|---|---|---|
| 296,235 A | 4/1884 | Sill |
| 672,584 A | 4/1901 | Anderson |
| 825,400 A | 7/1906 | Lightbrown |
| 1,084,184 A | 1/1914 | Wenieke |
| 1,158,846 A | 11/1915 | Punch |
| 1,378,243 A | 5/1921 | Kracke |
| 1,675,736 A | 7/1928 | Sturgis |
| 1,708,052 A | 4/1929 | Channell |
| 1,716,171 A | 6/1929 | Horihata |
| 1,916,649 A | 7/1933 | Appleford |

(Continued)

FOREIGN PATENT DOCUMENTS

| | | |
|---|---|---|
| CH | 700702 B1 | 10/2010 |
| DE | 10003899 C1 | 9/2001 |

(Continued)

OTHER PUBLICATIONS

International Search Report for PCT/US14/30724 dated Aug. 18, 2014.

*Primary Examiner* — Mark Spisich

(74) *Attorney, Agent, or Firm* — The Dobrusin Law Firm, P.C.; Daniela M. Thompson-Walters

(57) ABSTRACT

A cleaning apparatus includes different combinations of a reduced compressible material substrate and a thicker paddle head, and a reduced radius tip to clean sharp corners. A slide lock holds one pin end of the handle to the cleaning head. A small sized cleaning head with at least two reduced radius tips is also disclosed.

20 Claims, 14 Drawing Sheets

(56) References Cited

U.S. PATENT DOCUMENTS

| | | | |
|---|---|---|---|
| 1,989,921 | A | 2/1935 | Goddard |
| 1,993,571 | A | 3/1935 | Soderberg |
| 2,127,886 | A | 8/1938 | Plon |
| 2,192,910 | A | 3/1940 | Hollenbeck |
| 2,291,435 | A | 7/1942 | Anderson et al. |
| 2,301,586 | A | 11/1942 | Rubin |
| 2,304,127 | A | 12/1942 | Stetson |
| 2,315,325 | A | 3/1943 | Gavurin |
| 2,560,008 | A | 7/1951 | Steward |
| 2,646,588 | A * | 7/1953 | Wagner ................. A47L 13/255 15/147.2 |
| 2,682,071 | A * | 6/1954 | Linderoth ............... A47L 13/29 15/147.2 |
| 2,694,212 | A | 11/1954 | McGraw |
| 2,722,704 | A | 11/1955 | Warden |
| 2,764,774 | A | 10/1956 | Belsky et al. |
| 2,790,193 | A | 4/1957 | Wilding |
| 3,099,855 | A | 8/1963 | Nash |
| 3,295,155 | A | 1/1967 | Belsky et al. |
| 3,327,338 | A | 6/1967 | Young |
| 3,362,037 | A | 1/1968 | Griffin |
| 3,704,479 | A | 12/1972 | Whitaker |
| 3,761,991 | A | 10/1973 | Moss |
| 4,503,579 | A | 3/1985 | Nicely |
| 4,822,194 | A | 4/1989 | Simonette |
| 4,852,210 | A | 8/1989 | Krajicek |
| 4,926,522 | A | 5/1990 | Wang |
| 5,003,659 | A | 4/1991 | Paepke |
| 5,012,544 | A | 5/1991 | Verry |
| 5,095,574 | A | 3/1992 | Khanzadian |
| 5,177,831 | A | 1/1993 | Wirth |
| 5,333,347 | A | 8/1994 | Stranders |
| 5,556,470 | A | 9/1996 | Gruber |
| 5,596,787 | A | 1/1997 | Stevens et al. |
| 5,603,138 | A | 2/1997 | Bonis |
| 5,657,507 | A | 8/1997 | Wasak |
| 5,876,141 | A | 3/1999 | Hsu |
| 5,918,342 | A | 7/1999 | Smith et al. |
| 6,178,584 | B1 | 1/2001 | Post |
| 6,243,909 | B1 | 6/2001 | Graham et al. |
| 6,523,213 | B1 | 2/2003 | Post |
| 6,543,951 | B1 | 4/2003 | Bauman |
| 6,769,153 | B1 | 8/2004 | Post et al. |
| 6,795,999 | B1 | 9/2004 | Post et al. |
| 6,928,687 | B2 | 8/2005 | Post et al. |
| 6,973,695 | B1 | 12/2005 | Nesler |
| 7,231,684 | B2 | 6/2007 | Post |
| 7,343,698 | B2 | 3/2008 | Sugimoto et al. |
| 7,401,346 | B2 | 7/2008 | Hayashi et al. |
| 7,555,814 | B2 | 7/2009 | Lee et al. |
| 7,581,273 | B2 | 9/2009 | Dobrin et al. |
| 7,904,987 | B2 | 3/2011 | Bayon et al. |
| 8,250,700 | B2 | 8/2012 | Pung et al. |
| 8,407,848 | B2 | 4/2013 | Pung et al. |
| 2003/0182751 | A1 | 10/2003 | White |
| 2004/0229557 | A1 | 11/2004 | Annis et al. |
| 2004/0237240 | A1 | 12/2004 | Post et al. |
| 2005/0034260 | A1 | 2/2005 | Post |
| 2005/0138742 | A1 | 6/2005 | Jaszenovics et al. |
| 2006/0200933 | A1 | 9/2006 | McDonnell |
| 2007/0094829 | A1 | 5/2007 | Dotterman et al. |
| 2007/0130710 | A1 | 6/2007 | Chen et al. |
| 2007/0245509 | A1 | 10/2007 | Nesler |
| 2008/0022473 | A1 | 1/2008 | Risch et al. |
| 2008/0034521 | A1 | 2/2008 | Probasco |
| 2008/0172817 | A1 | 7/2008 | Riddell |
| 2009/0025168 | A1 | 1/2009 | DeRoma |
| 2009/0106924 | A1 | 4/2009 | Park |
| 2009/0144923 | A1 | 6/2009 | Tuman et al. |
| 2011/0020051 | A1 | 1/2011 | Robertson et al. |
| 2013/0061414 | A1 | 3/2013 | Swist et al. |
| 2014/0013531 | A1 | 1/2014 | Tuman et al. |
| 2014/0237749 | A1 * | 8/2014 | Yang ..................... A47L 13/254 15/228 |

FOREIGN PATENT DOCUMENTS

| | | | |
|---|---|---|---|
| DE | 102006062686 | * | 6/2008 |
| EP | 940310 | * | 9/1999 |
| EP | 2233055 | * | 9/2010 |
| FR | 1056318 A | | 2/1954 |
| GB | 109280 A | | 9/1917 |
| GB | 152089 | * | 10/1920 |
| GB | 406211 A | | 2/1934 |
| GB | 406800 A | | 3/1934 |
| GB | 904432 | * | 8/1962 |
| JP | 2007167092 A | | 7/2007 |
| WO | 92/19142 | * | 11/1992 |

* cited by examiner

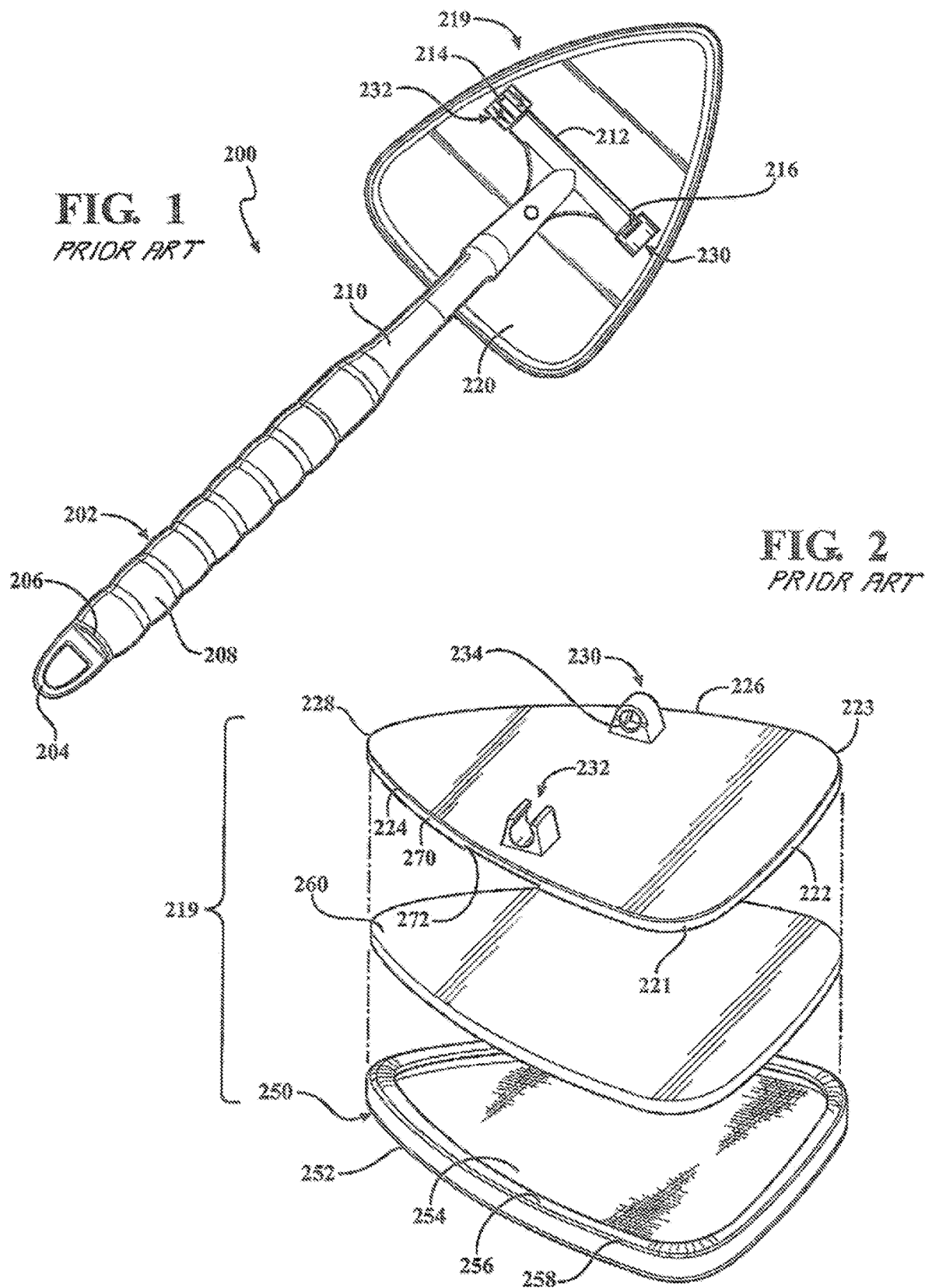

CLEANING APPARATUS

CROSS-REFERENCE TO RELATED APPLICATIONS

This continuation application claims priority benefit to co-pending U.S. patent application Ser. No. 14/216,563 filed Mar. 17, 2014, now U.S. Pat. No. 9,402,515, which claims priority benefit to U.S. Provisional Patent Application Ser. No. 61/792,262, filed Mar. 15, 2013, U.S. Provisional Patent Application Ser. No. 61/879,819, filed Sep. 19, 2013 and U.S. Provisional Patent Application Ser. No. 61/896,734, filed Oct. 29, 2013, the contents of each of which are incorporated herein by reference in its entirety.

BACKGROUND

The present disclosure relates, in general, to cleaning apparatus and, more specifically, to apparatus for cleaning glass.

Various tools are available to clean glass, such as the exterior surface of vehicle windows. Such tools typically include a handle and a perpendicularly oriented cleaning element, such as a wiper blade, sponge rubber pad, and combinations thereof. Water or ammonia-based cleaning fluid is applied to the exterior surface of the vehicle window and scraped off by the tools to remove debris. Such tools are easy to use on the exterior surface of vehicle windows since the exterior surface of the vehicle windows is easily accessible both to apply cleaning fluid to the windows and to remove the fluid and debris from the windows.

However, such tools are ineffective in cleaning the inner surface of vehicle windows. The extreme angles of the vehicle windshield and backlight with respect to the dashboard and rear seat shelf in conjunction with adjacent vehicle components, such as the rear-view mirror, steering wheel and rear, center brake light housing make it difficult to get the edges of a cleaning tool close to the extreme lower edges of the windshield and backlight. In addition, applying fluid, which is typically in the form of a spray, to the inner surfaces of the windshield and backlight results in a significant amount of the spray being deposited on the underlying horizontal surfaces adjacent to the windows, such as the vehicle dashboard and the rear shelf.

Thus, the most common implements used to clean the inner surfaces of vehicle windows are sponges, rags, and paper towels. Manual force is exerted through the user's hands to manually apply cleaning fluid and/or spray to the inner surface of the windows and then to manipulate the cleaning element in a back and forth or circular motion across the surface of the windows. While a user may be able with a considerable amount of effort to clean most of the inner surface of the vehicle window, it is still difficult to completely clean the edges of the window and, more importantly, the lower edges of a vehicle windshield and backlight.

A variety of tools has been devised specifically to clean the inner surfaces of vehicle windows. Such tools are typically formed of a pad which is connected to an elongated handle. A cleaning element is attached to one side of the pad by various means including clips, straps, or hooks and pile fasteners. However, each of these tools is specifically devised for a single type of cleaning operation, such as scrubbing or drying, but not both.

An improved and more effective cleaning apparatus is disclosed in U.S. Pat. Nos. 7,231,684 and 6,795,999, the current version of which is shown in FIGS. 1-7B. In the illustrated cleaning apparatus, the inner absorbent layer between the bottom surface of the paddle and the encompassing cleaning element or bonnet is formed of an easily compressible foam material. Besides being absorbent, the foam layer provides a high friction-gripping surface for the cleaning element or bonnet to retain the cleaning element or bonnet in its formed shape and in continuous contact with the underlying surface being cleaned.

However, the substrate foam layer is severely affected by the cleaning head design, which results in a non-existent cleaning outcome in several critical areas of the cleaning apparatus, typically at the tip and corner edges of the paddle and along the side edges between the tip and the corner edges of the paddle.

The combination of the height of the foam layer which has a 3/16th inch thickness and projects outward from the 1/16th inch length peripheral lip of the paddle by another 1/8th inch, along with the acting force of the elastic cleaning element cover attached over the paddle results in the foam layer being compressed at the tip and corner edges and/or the side edges of the paddle to the point that the foam is unable to retain its full thickness at each of the critical tip and corner edges and/or along the side edges. This results in separation of the cleaning element below this portion of the foam layer from contact with the surface being cleaned, as shown in FIG. 5, 6, 7B, resulting in incomplete cleaning of the entire surface.

The existing cleaning apparatus has a 1/16th inch peripheral lip or ridge added to a uniformly thick 1/16th inch cleaning head or paddle to aid in increasing the structural integrity of the thin 1/16th inch cleaning head. This creates a paddle with a 1/8th inch total height for peripheral edge wall. A one-inch wide cutout of the 1/16th inch perimeter wall height at the center side areas of the cleaning head adjacent to the handle receivers was added to aid in cleaning head flexibility.

SUMMARY

A cleaning apparatus that includes a cleaning head having a top surface, a bottom surface and a peripheral edge, a handle pivotally coupled to the cleaning head, a cleaning element removably affixed to the cleaning head, and a compressive material substrate mounted on a bottom surface of the cleaning head.

The cleaning element includes a body and elastic for removably securing the body over the bottom surface and the peripheral edge of the cleaning head. The compressive material substrate is mounted on a bottom surface of the cleaning head within the peripheral lip and projects below an end of the peripheral lip by between 0.001 to 0.094 inches.

The peripheral lip has a length from the cleaning head of 0.0625 inches, and a total thickness of the compressive material layer is from 0.0635 to 0.1565 inches.

The cleaning head defines a concave shape in the bottom surface from a tip end to an opposed end.

The peripheral edge of the cleaning head has a greater thickness than a thickness of a central portion of the cleaning head, and the bottom surface of the cleaning head gradually decreasing in thickness from the peripheral edge to a central portion of the cleaning head.

The bottom surface of the cleaning head linearly decreases in thickness from the peripheral edge toward the central portion of the cleaning head.

The bottom surface of the cleaning head arcuately decreases in thickness from the peripheral edge toward the central portion of the cleaning head.

A recess is disposed in the top surface of the cleaning head forming a reduced thickness in the cleaning head, and a compressive foam substrate carried on the bottom surface of the cleaning head. The recess extends laterally across the cleaning head between opposed sides of the cleaning head.

The cleaning head has a thickness of between greater than 1/16th inch to 0.25 inches, and the compressive material substrate extends from the cleaning head to about 0.0156 inches.

The cleaning head has a tip end with a radius from about 1.0 mm to less than 19.05 mm.

The cleaning apparatus has a pair of receivers carried on the cleaning head releasably engageable with opposed pin ends of a handle to pivotally attach the handle to the cleaning head. One of the receivers on the cleaning head carries a movable lock member movable between a first position allowing insertion of one pin end of the handle into one receiver and a closed lock position preventing separation of the pin end of the handle from the cleaning head.

The cleaning head can have a six-sided peripheral shape formed of two longitudinally spaced tip ends and four peripheral corners.

BRIEF DESCRIPTION OF THE DRAWING

The various features, advantages and other uses of the present cleaning apparatus will become more apparent by referring to the following detailed description and drawing in which:

FIG. 1 is a perspective view of a prior art cleaning apparatus;

FIG. 2 is an exploded perspective view of the cleaning head and cleaning element of the prior art cleaning apparatus shown in FIG. 1;

DETAILED DESCRIPTION

Figure 3:
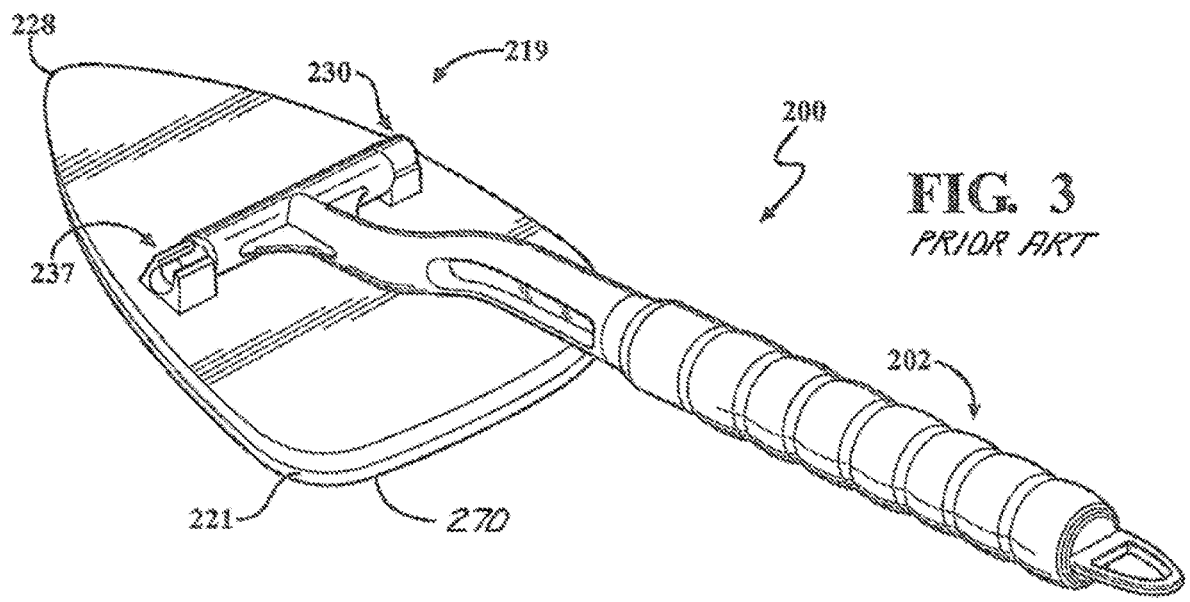
FIG. 3 is a perspective view of the prior art cleaning apparatus, with the cleaning element removed.

A prior art cleaning apparatus 200 includes a handle 202 having a mounting hangar 204 at a first end 206. A handgrip portion 208 extends from the first end 206 and is formed or covered with a high friction, easily grippable material.

The handle 202 continues from the handgrip portion 208 through a solid portion 210 to a T-shaped second end 212. Mounting pins 214 and 216, which may be integrally molded as part of the end 212 or fixedly mounted in the end 212, project oppositely from the end 212. A cleaning head 219 includes a paddle 220 has a generally triangular shape formed of an end 222, opposed angled or gently curved sides 224 and 226, an apex or tip 228 opposite the end 222, and corners or corner edges 221 and 223 formed between the end 222 and the sides 224 and 226. The center portion of the sides 224 and 226 may be raised slightly from a plane extending between the end 222 and the tip 228 along a longitudinal axis of the paddle 220 to form at least the bottom surface of the paddle 220 in a concave shape. The entire paddle 220 may have the same concave shape. Alternately, the central portion of the paddle 220 may have a reduced thickness than the end 222 and tip 228.

Receivers 230 and 232 are integrally or separately fixed to one surface of the paddle 220. The receiver 230 is in the form of a body having an arcuate outer shape, for example.

A bore 234 extends through at least one side of the first receiver 230 and opens toward the opposite receiver 232.

Figure 4:
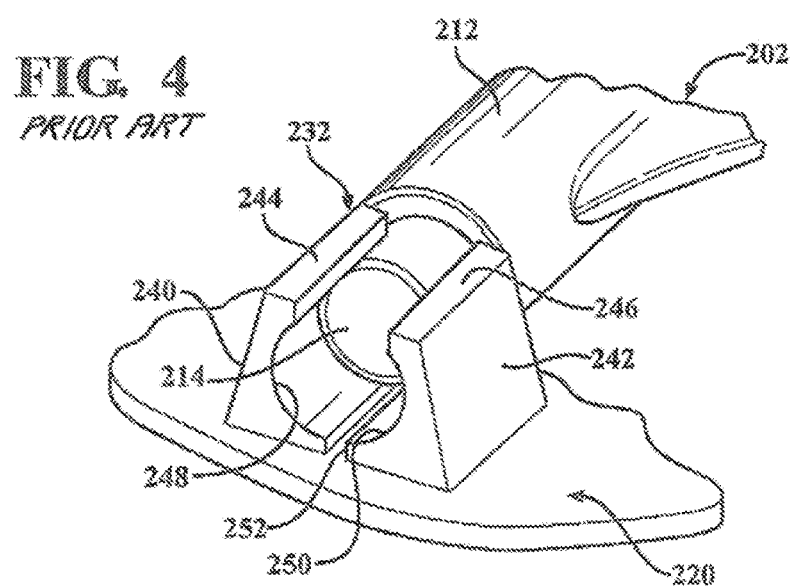
FIG. 4 is an exploded, perspective view showing the prior art attachment of one end of the handle to the cleaning head.

In this aspect, the receiver 232 forms a snap connection with the pin 214 on the handle 202. The receiver 232, shown in detail in FIGS. 2 and 4, is formed of first and second resiliently movable, spring legs 240 and 242. The legs 240 and 242 project from the top surface of the paddle 220 to an outer end 244 and 246, respectively. The inner surfaces of the legs 240 and 242 have a generally arcuate shape 248 and 250, sized to pivotally receive and capture the pin 214 on the handle 202, as clearly shown in FIG. 4. The inner space or distance between the ends 244 and 246 of the legs 240 and 242, respectively, is less than the outer diameter of the pin 214.

In use, the pin 214 is forced through the opening between the ends 244 and 246 of the legs 240 and 242 bending the legs 240 and 242 outward until the entire pin 214 passes through the ends 244 and 246. At this time, the legs 240 and 242 snap back to a normal position rotatably capturing the pin 214 therein.

If it is desirable to separate the handle 202 from the paddle 220, a reverse operation is employed in which the pin 214 is forcibly pulled through the opening between the ends 244 and 246 of the legs 240 and 242.

As shown in FIG. 4, an aperture 252 may be formed at a bottom portion of the legs 240 and 242 to facilitate resilient movement or bending of the legs 240 and 242 as described above.

It will be understood that the snap-connection provided by the receiver 232 can also be repeated for the receiver 230 by forming the receiver 230 in the same manner as the receiver 232.

For enhanced rigidity of the paddle 220, while still retaining the flexibility of the paddle 220 to adapt the concave shape of the bottom surface of the paddle 220 to a window or glass surface, a peripheral ridge or lip 270 is integrally formed on the paddle 220 along the side edges 224 and 226 and the end 222 to substantially completely encompass the entire periphery of the bottom surface of the paddle 220. The lip 270 surrounds an inner disposed absorbent layer 260, described hereafter. A notch or cutout 272 is formed along each side edge of the lip 270 underlying the side edges 224 and 226 of the paddle 220 and generally centered along the lateral axis of the receivers 230 and 232. The notch 272 enhances the flexibility of the paddle 220 when a downward force is exerted on the paddle 220 through the handle 202.

The cleaning apparatus including a cleaning element formed of a drying element 250 mountable on the paddle 220 is shown in FIGS. 1, 2, 6 and 7B. The drying element 250 is in the form of a pliable body 252 sized to releasably mount about the paddle 220. The body 252 has a first major surface 254 which is disposable under the bottom surface of the paddle 220 and a peripheral edge 256 surrounding an open end. The peripheral edge 256 may be stitched to prevent unraveling or separation of the fibers forming in the body 252. Preferably, the body 252 is formed of an absorbent material, such as cotton, etc.

Elastic means 258 in the form of an elastic band is stitched or otherwise attached to the peripheral edge 256 of the body 252 to provide an elastic force for closing the peripheral edge 256 to a small open diameter to thereby securely, yet releasably mount the body 252 about the paddle 220. At the same time, the elastic means 258 allows the body 252 to be easily removed from the paddle 220 and replaced with a clean, dry body 252 when necessary.

It will be understood that the body 252 may be provided in different sizes to conform to the shape and size of the larger or smaller paddles.

As shown in FIG. 2, an absorbent layer or pad 260 of substantially the same shape as the paddle 220 is interposed between a bottom surface of the paddle 220 and the body 252 to provide fluid absorbent features. The pad 260 can be loosely interposed between the paddle 220 and the body 252 or fixed on the paddle 220 by adhesive or other suitable means.

The body 252 can be formed of a mesh or rough material to act as a scrubbing surface in conjunction with the fluid filled absorbent layer 260 which dispenses fluid during the scrubbing operation. Thus, the body 252 and the absorbent layer 260 function as a scrubbing element to apply cleaning fluid to a window and, with suitable scrubbing movement, to simultaneously loosen dirt and other debris from the window.

The body 252 may be used merely as a dusting cloth to remove dust from a vehicle window or other interior vehicle surface. Further, the body 252 and the interior absorbent layer 260 are ideally suited to act as a sponge and scrubbing surface in applying cleaning fluid or water to the interior surface of a vehicle window and scrubbing or removing debris stuck on a window.

Once absorbent layer 260 is wetted with the cleaning fluid and the body 252 mounted over the bottom surface on the paddle 220, the handle 202 of the cleaning apparatus 200 is grasped by one hand of the user and then moved adjacent to the window until the body 252, contacts the interior surface of the window. The cleaning apparatus 200 is then moved in any motion, such as back and forth, sideways, circular or combinations thereof to apply the cleaning fluid to the entire interior surface of the window and to remove any debris stuck on the window. The body is then removed from the handle 202 by simply reversing the insertion operation as described above. Another clean body 252 can then be attached to the handle 202 as described above. The body 252 is then brought into engagement with the window and again moved in any fashion across the entire surface of the window to dry the previously applied cleaning fluid and remove any loose debris from the window.

If, at any time, the body 252 becomes saturated with cleaning fluid or accumulates a significant amount of dirt or other debris, the user may simply remove the body 252 from the associated paddle 220 and then mount a clean, dry body 252 on the paddle 220 to continue with the cleaning operation.

Figure 6:
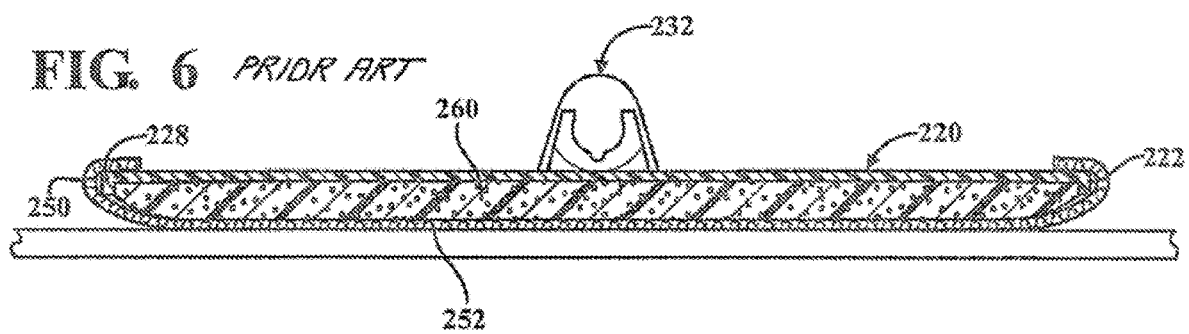
Figure 7A:
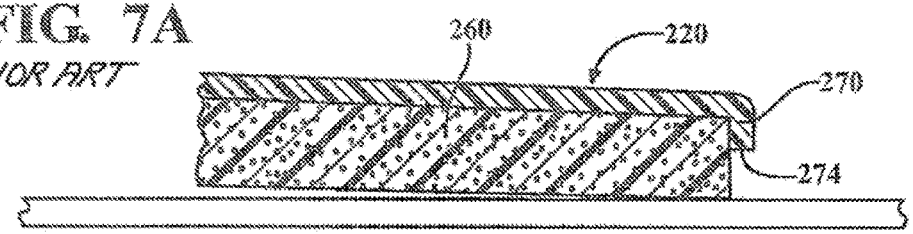
FIGS. 7A and 7B are enlarged, partial, side-elevational views showing the construction and use of the prior art cleaning apparatus shown in FIGS. 1-6.
Figure 7B:
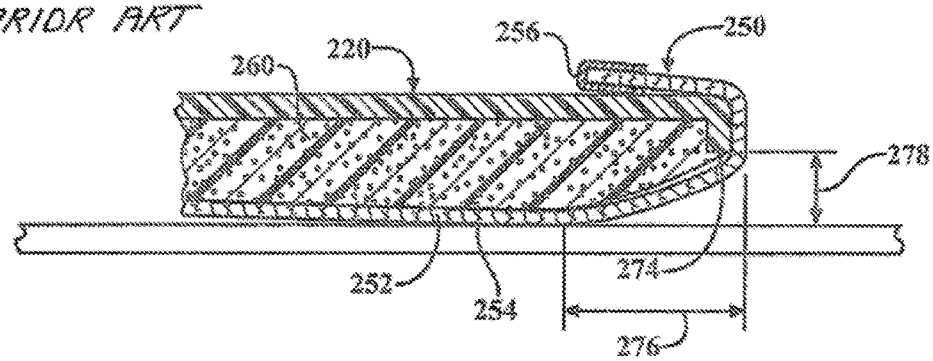

However, as shown in FIGS. 6, 7A and 7B, the elastic force exerted by the elastic edges 258 of the body 252 on the exposed portions of the foam used to form the absorbent layer 260 which extends below the lower most edge 274 of the peripheral lip 270 causes the body 252 to compress the foam layer 260 at the tip or corners of the paddle 220 as well as along the side edges of the paddle 220. The elastic force of the body 252 compresses the foam layer 260 to such an extent that the edges of the body 252 are spaced from the underlying surface to be cleaned in both a horizontal direction 276 and a vertical direction 278 from the tip 228. The same horizontal and vertical gaps 276 and 278 occur at the corners 221 and 223 of the paddle 220 as well as along the side edges 224 and 226 and the end 222.

When the tip end 228 or any of the side edges 224 or 226 or the end 222 or the corners 221 and 223 are moved into contact with a frame or structure surrounding the edge of a window or glass surface being cleaned, the gaps 276 and 278 prevent the edge portions of the glass or window from being contacted by the body 252 and therefore are not cleaned.

Referring now to FIGS. 8A-11 there is depicted one aspect of a cleaning apparatus 28 which has significantly improved cleaning efficiency as compared to the previously described current cleaning apparatus, particularly at the tip or corner edges and the side edges of the paddle 220. The cleaning apparatus 28 is formed substantially the same as the cleaning apparatus 200 with one exception.

Figure 5:
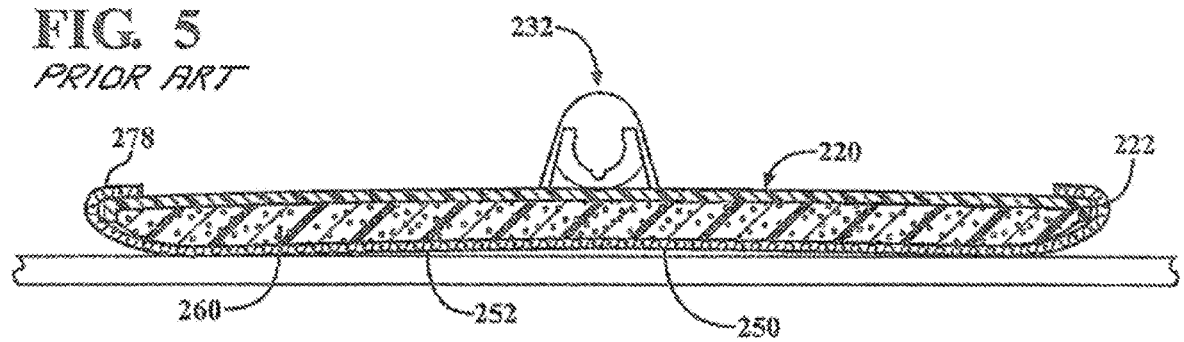
FIGS. 5 and 6 are side elevational views of the prior art cleaning head and cleaning element shown in FIGS. 1-4 in use position.
Figure 8A:
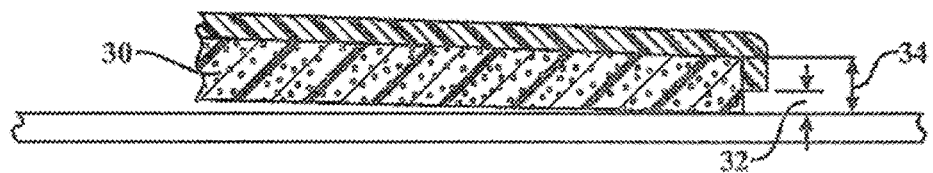
FIGS. 8A and 8B are partial, enlarged perspective views in one aspect of a new cleaning apparatus according to the invention.
Figure 8B:
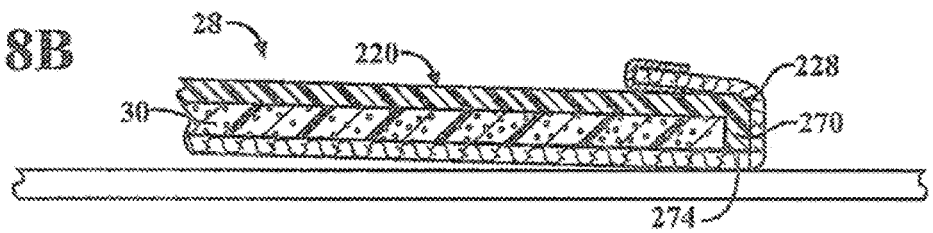
Figure 9:
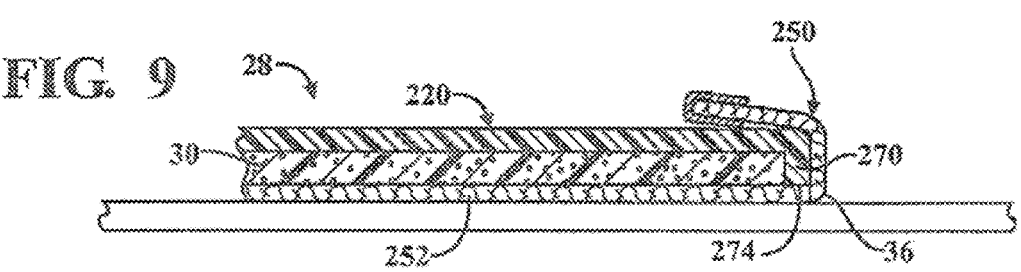
FIG. 9 is an enlarged, partial, side elevational view showing the cleaning head and cleaning element depicted in FIGS. 8A and 8B, in a use position.
Figure 10:
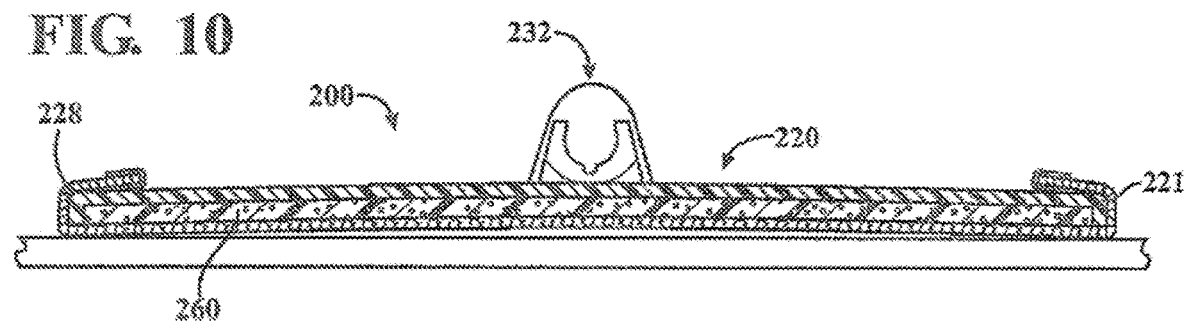
FIG. 10 is a side elevational view of the cleaning head and cleaning element initial contact position with a surface to be cleaned.
Figure 11:
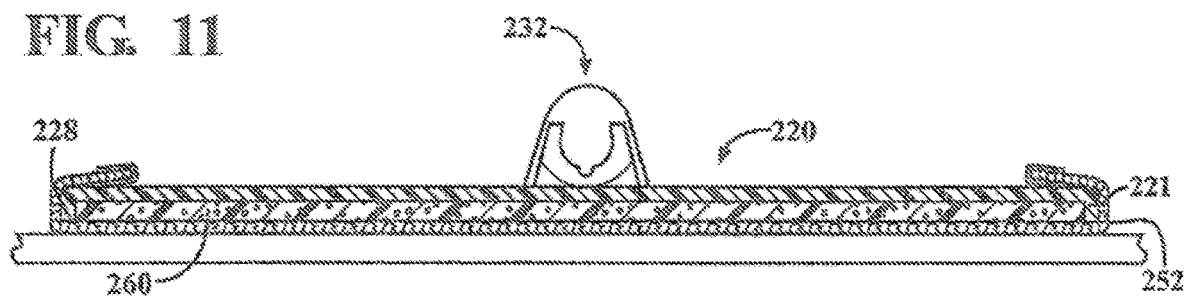
FIG. 11 is a side elevational view of the cleaning head and cleaning element, shown in FIG. 10, in a use position.

As shown in FIGS. 8A, 8B and 9, the thickness of the foam substrate 30 that is exposed below the lower most edge 274 of the peripheral lip or wall 270 of the cleaning head 220 is reduced to a minimum. For example, the thickness 32 of the portion of the foam substrate 30 extending below the lower most edge 274 of the peripheral lip or wall 270 can range from 0.001 inches to 0.094 inches. The total thickness 34 of the foam substrate 30, including a 1/16th inch of the foam substrate 30 surrounded by the peripheral lip 270, is from 0.0635 to 0.1565 inches. As shown in FIGS. 10 and 11, the reduced thickness 32 of exposed foam substrate 30 eliminates the previous compression of the foam substrate 30 adjacent the tip 228 or corner edges 221 and 223 and/or the side edges 224, 226 and 222 of the paddle 220 thereby enabling the cleaning element 250 to assume a near perpendicular bend or corner 36 as it wraps around the lower most edge 274 of the peripheral lip or wall 270, as shown in FIG. 9. This near perpendicular bend 36 creates a perpendicular corner in the cleaning element body 252 which eliminates the gaps 276 and 278 in the horizontal and vertical directions shown in FIGS. 5, 6, 7B for improved efficiency in cleaning all exposed portions of the glass or surface to be cleaned, particularly corners or edges of the glass when the cleaning head 220 is brought into contact with the frame or raised edge structure surrounding the glass or surface.

The compressive material substrate may be formed of any material type, density, softness or hardness, and can include, for example, but not limited to any type of close cell or open cell foam, gel or rubber materials which measure less than 0.1565 inches in thickness to a minimum thickness of 0.0635 inches. This material substrate may be employed with cleaning head or paddle constructions having a thickness from slightly greater than 1/16th inch up to 0.250 inches.

Referring now to FIGS. 12A-12D, another aspect of a cleaning apparatus 100 is depicted. The cleaning apparatus 100 is substantially the same as the cleaning apparatus 200 described above and shown in FIGS. 1-7B, except for the following enumerated differences. It should be noted that the paddle 102, in this aspect, does not have a peripheral depending lip as in the previously described cleaning apparatus 200.

In this aspect, the cleaning apparatus 100, has a paddle 102 which is generally planar in shape, but with the longitudinal concave bend from a tip edge to the opposed rear edge for flexibility when forced against a surface to be cleaned. The paddle 102 itself is made thicker than the previous 1/16th inch paddles and may be made in thickness from 0.07 inches to approximately 0.250 inches. This increased thickness prevents warping of the paddle 102 and insures that all portions of the bottom surface of the paddle 102 lay flat against and in contact with the surface being cleaned when the cleaning apparatus 100 is moved to a cleaning position as compared to the prior art paddle shown in FIGS. 12E and 12F;

In this aspect, the foam substrate 104 is less than a 1/8th of inch thick and may have a thickness of between 0.001 inches to 0.100 inches.

The stable non-warping state of the paddle 102 and the reduced thickness foam substrate 104 insures that the tip, corner and side edges of the cleaning element 106 form a substantially 90° sharp edged corner as the cleaning element wraps the edges of the foam substrate 104 and the cleaning paddle 102. This presents a square corner without a gap as in prior cleaning apparatus described above, for more effective and complete cleaning of a surface.

Figure 12A:
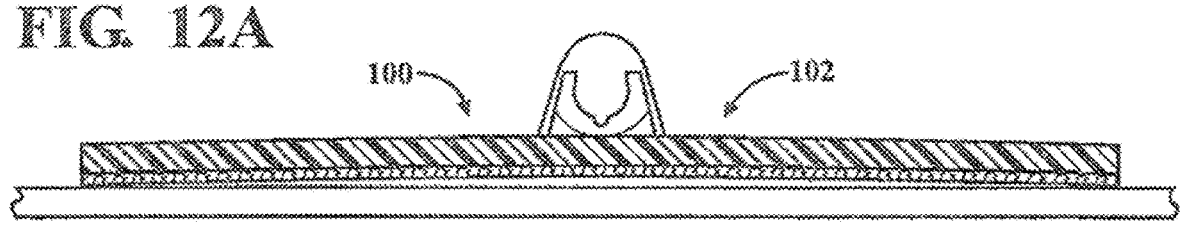
FIGS. 12A and 12B are side elevational views showing the cleaning head in an initial contact and a use position.
Figure 12B:
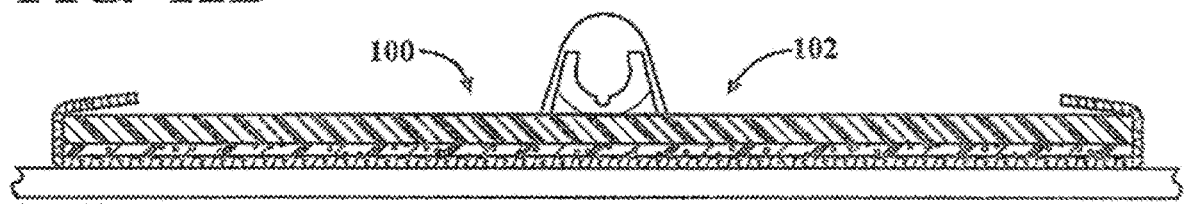
Figure 12C:
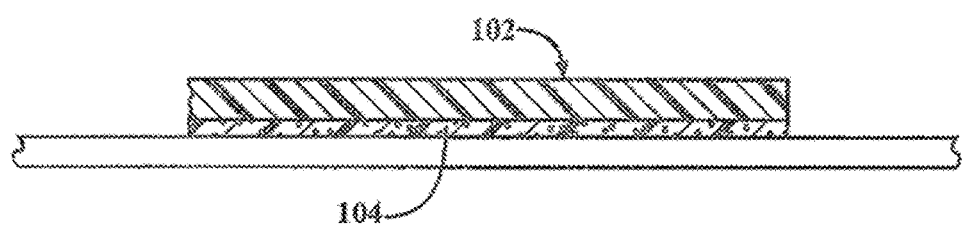
FIGS. 12C and 12D are enlarged, partial, side-elevational views of the new cleaning apparatus head and cleaning element configurations.
Figure 12D:
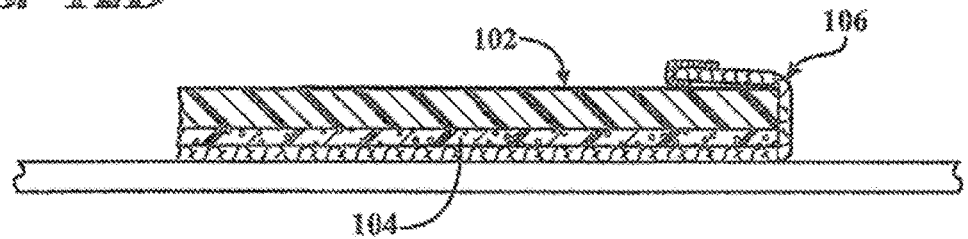
Figure 12E:
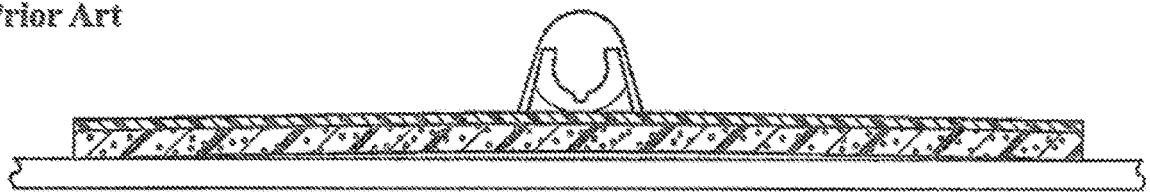
FIGS. 12E and 12F are side-elevational views of the prior art cleaning head shown in FIGS. 1 and 2.
Figure 12F:
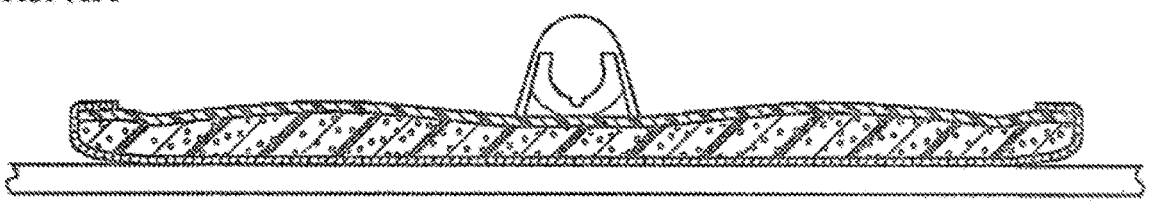
Figure 12G:
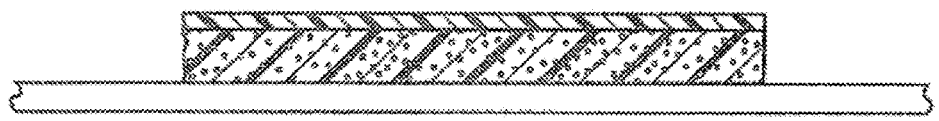
FIGS. 12G and 12H are enlarged, partial, side-elevational views of the prior art cleaning head shown in FIGS. 1 and 2.
Figure 12H:
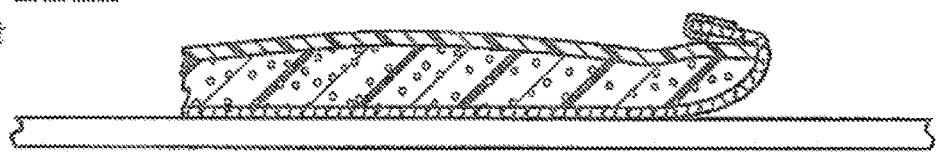
Figure 13:
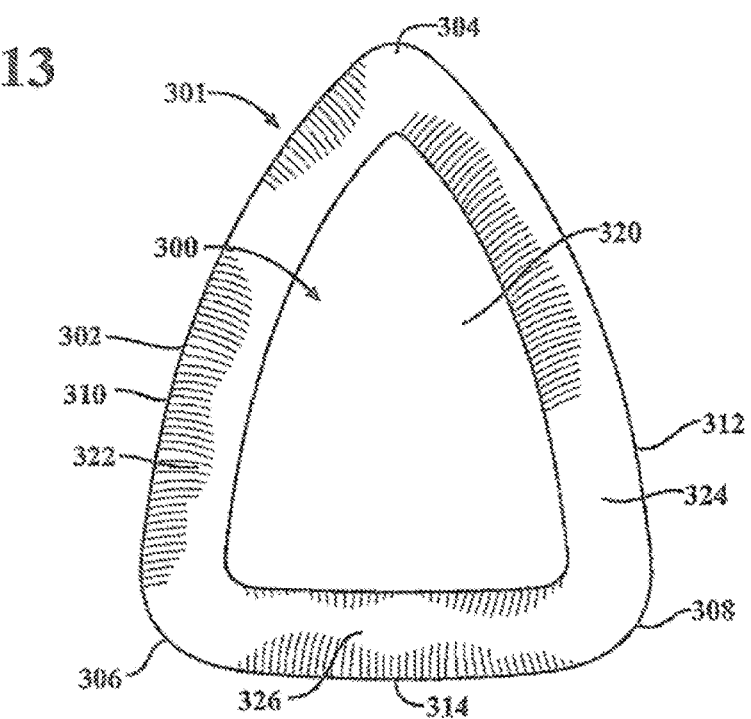
FIG. 13 is a plan view of an aspect of a cleaning head.

The prior art paddle and foam substrate shown in FIGS. 12G and 12H, has a thinner 1/16-inch paddle and thicker 3/16 foam which led to warping and edge gaps when the elastic edged cleaning element was attached to the paddle.

Another aspect of a cleaning apparatus 301 is shown in FIGS. 13-15B. In this aspect, the bottom surface of the cleaning head or paddle 300 lacks a peripheral lip or peripheral wall, but includes an increased thickness at the peripheral edge 302 extending all along the peripheral edge from the tip 304 to the opposed corners 306, 308 and the intervening side edges 310, 312 and 314. The bottom surface of the cleaning head 300 tapers in a linear or arcuate manner from the peripheral edges 302 inward of decreasing thickness toward a center 320 of the cleaning head 300 in three major sections 322, 324, and 326. The center portion 320 centered about the longitudinal axis of the cleaning head 300 between the tip 304 and opposed ends 306, 308 of the cleaning head 300 may have a generally concave shape.

This cleaning head design provides increased rigidity of the cleaning head 300 at the peripheral edges 302 for the tip 304 and the opposed ends or corners 306 and 308 of the cleaning head 300 as well as along the intervening side edges 310, 312, and 314 to maintain a constant force across the entire bottom surface of the cleaning head 300, including along the peripheral edges 302 of the cleaning head 300, when the cleaning apparatus 301 is moved into a use position in engagement with a surface to be cleaned and force is exerted on the handle to the cleaning head 300 to flatten the bottom surface of the cleaning head 300 into full engagement with the surface to be cleaned.

Figure 14:
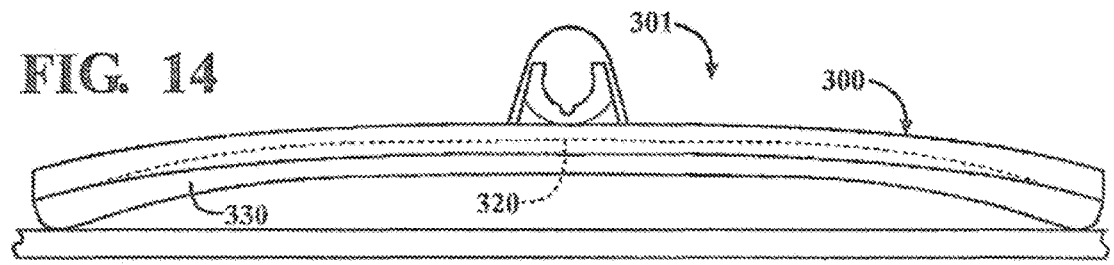
FIG. 14 is a side-elevational view of the aspect of the cleaning head shown in FIG. 13.
Figure 15A:
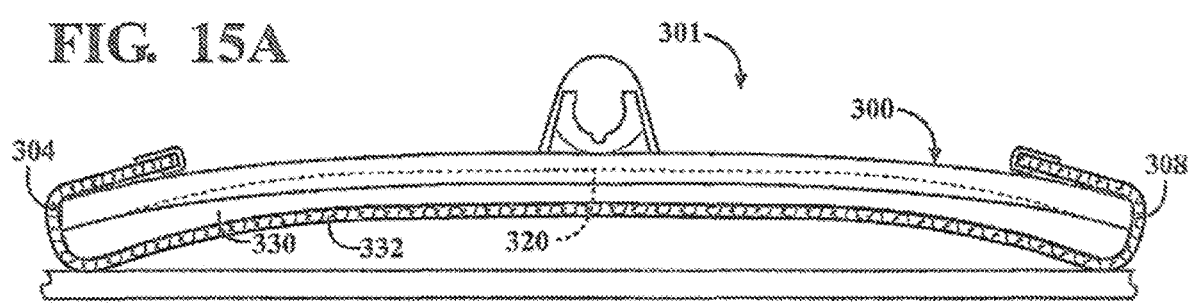
FIG. 15A is a side-elevational view of the cleaning head shown in FIG. 14, with a cleaning element attached.
Figure 15B:
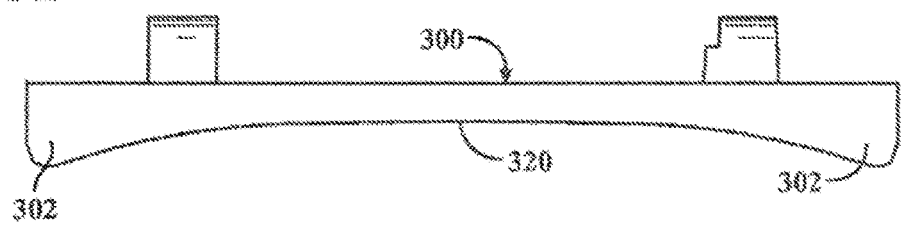
FIG. 15B is a lateral cross-sectional view of the cleaning head shown in FIGS. 14 and 15A, without the cleaning element and the foam layer.

The foam substrate 330 follows the contour of the bottom surface of the paddle 300 as shown in FIGS. 14, 15A and 15B. The cleaning element 332 does the same.

As shown in FIGS. 16A-18, an aperture may be formed at a bottom portion of the legs 240 and 242 to facilitate resilient movement or bending of the legs 240 and 242 as described above.

It will be understood that the snap-connection provided by the receiver 232 can also be repeated for the receiver 230 by forming the receiver 230 in the same manner as the receiver 232.

The receiver 232 carries a movable lock member 370 for securely retaining the pin 214 of the handle 202 in the receiver 232 to prevent inadvertent separation of the handle 202 from the paddle 220 if a tip end of the paddle 220 is caught in the corner of a window frame and force is exerted through handle 202 to the pin 214.

The lock member 370 includes a pair of channel members 350 and 352 respectively extending from the upper surface of the paddle 220 and disposed immediately adjacent an exterior surface of the legs 240 and 242, respectively, of the receiver 232. Each channel member 350 and 352 is formed with an inverted L-shape of two perpendicularly disposed legs 354 and 356, a closed end wall 358 at one end of the channel members 350 and 352 and an open end at the opposite ends of the legs 354 and 356. This configuration defines an inner channel in which are received a movable lock member 370. The movable lock member 370 includes a pair of side legs 372 and 374 which are joined together by inward extending top ends 376 and 378 and a raised center portion 380 having an interior concave surface complimentary to the exterior shape of the pin 214 on the handle 202.

The lower ends of the legs 372 and 374 respectively terminate in outward extending leg end flanges 384 and 386. The leg end flanges 384 and 386 are movably disposed within the channel members 350 and 352.

Figure 16A:
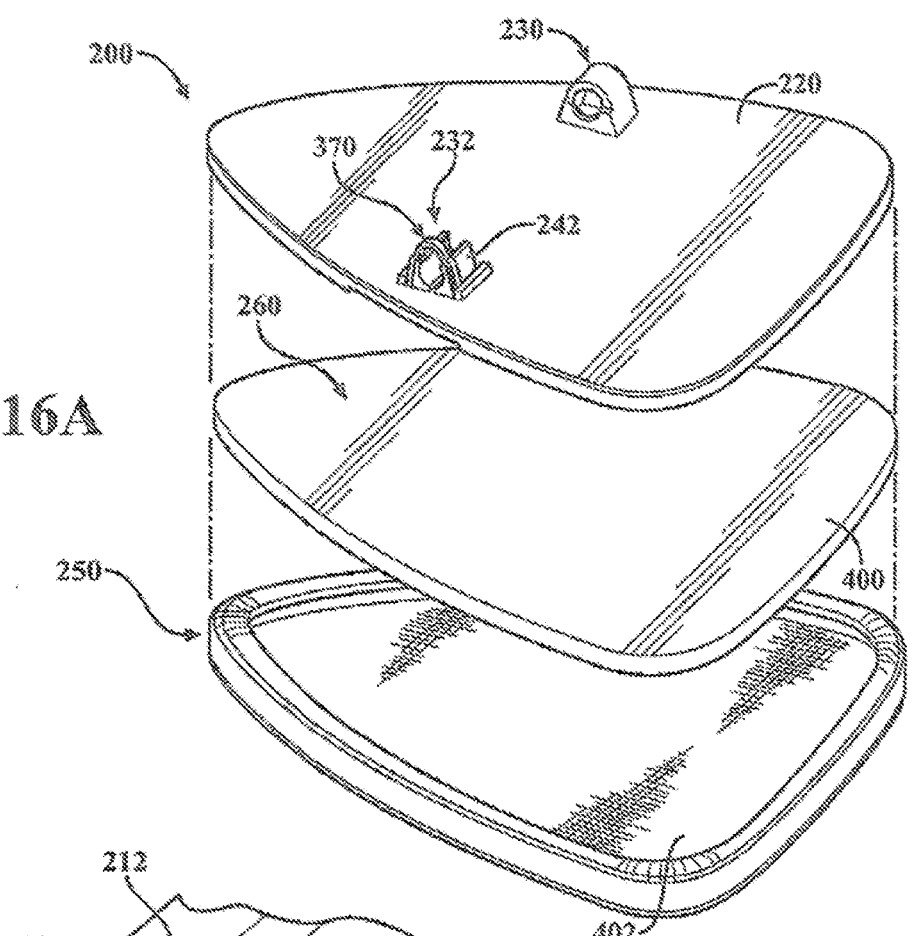
FIG. 16A is a partial, enlarged, left side perspective view showing a new handle 10 sliding lock mechanism.
Figure 16B:
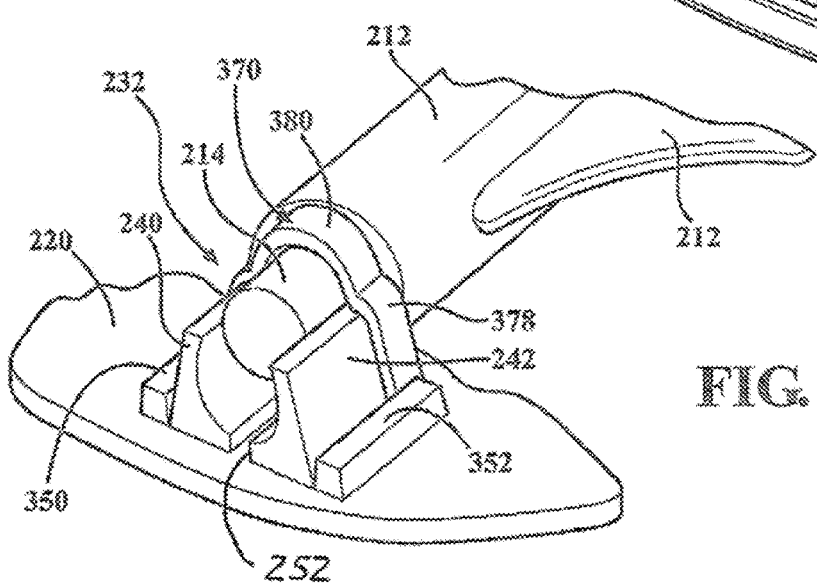
FIG. 16B is a partial, enlarged perspective view of the sliding lock mechanism depicted in a closed, locked position.
Figure 17:
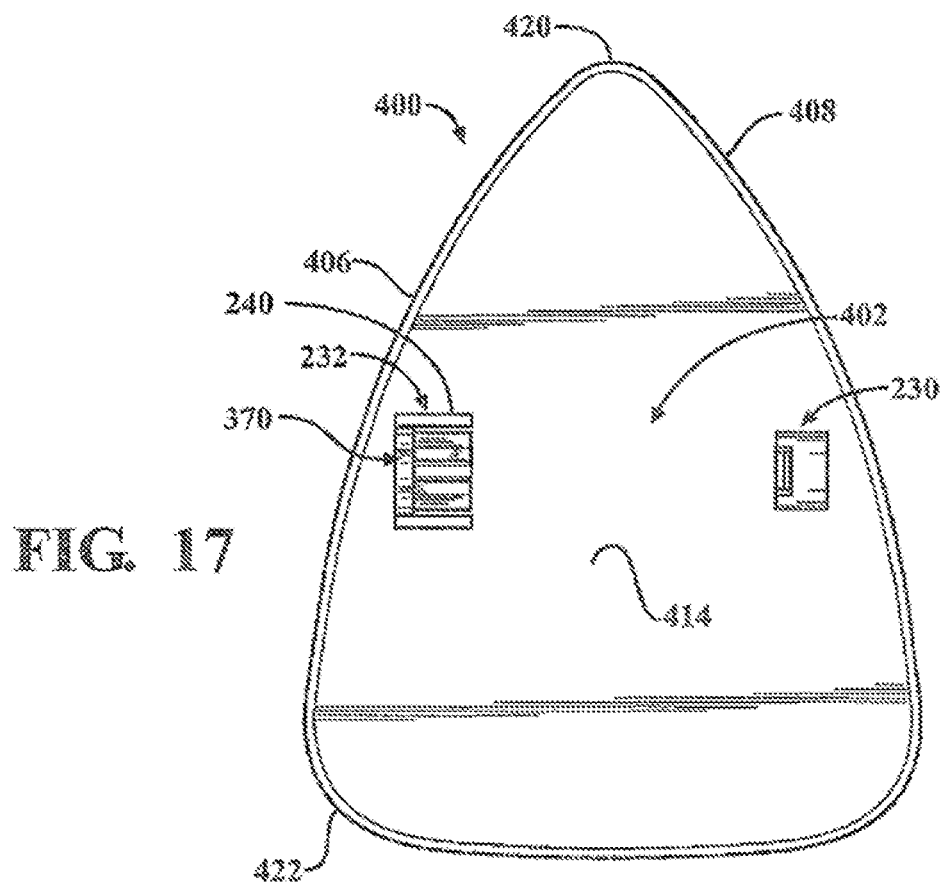
FIG. 17 is a plan view of the cleaning head shown in FIGS. 16A and 16B.
Figure 18:
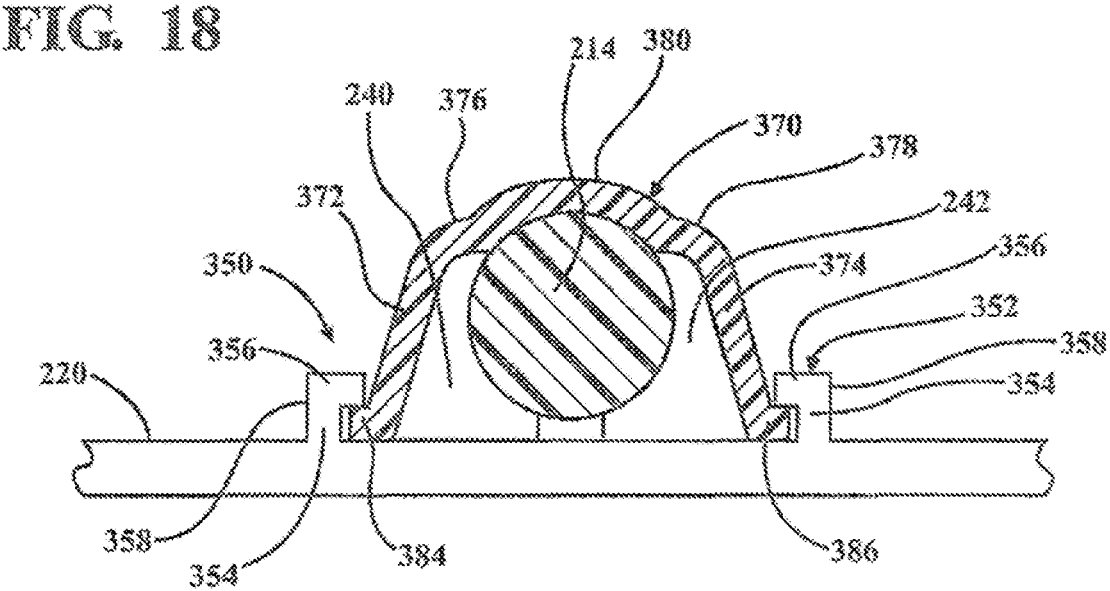
FIG. 18 is a cross-sectional view through the sliding lock mechanism of FIGS. 16A and 17.

This configuration enables the lock member 370 to move from a first open position shown in FIGS. 16A, 17 to a closed lock position shown in FIG. 16B. In the closed lock position, the lock member 370 overlays the pin 214 in the receiver 232 to prevent inadvertent separation of the pin 214 on the attached handle 202 from the paddle 220. During such movement of the lock member 370 between the first and second positions the channel members 350 and 352 provide a movable path for the leg end flanges 384 and 386. At the same time, the channel members 350 and 352 prevent outward movement of the leg end flanges 384 and 386 as well as lateral outward movement of the receiver legs 240 and 242 which could cause inadvertent release of the pin 214 on the handle 202 from the paddle 220.

In use, the lock member 370 is moved to a first open position shown in FIG. 17. The pin 214 is then forced between the opening between the upper ends 244 and 246 of the legs 240 and 242. With the pin 214 securely nested in the concave surfaces 248 and 250 of the receiver legs 240 and 242, the lock member 370 is moved to a second lock position with the arched center 380 overlaying the pin 214 and securing the pin 214, the legs 240 and 242 of the receiver 232 in a tight position preventing lateral outward movement of the legs 240 and 242 which could lead to inadvertent separation of the pin 214 from the receiver 232 and disengagement of the handle 202 from the paddle 220.

Figure 19:
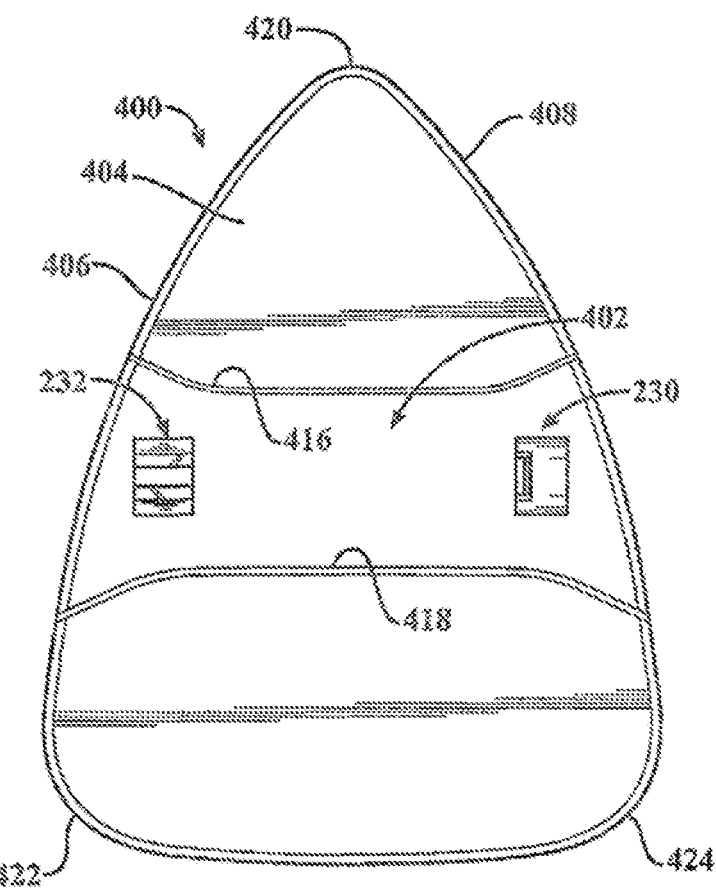
FIG. 19 is a plan view of another aspect of a cleaning head.
Figure 20:
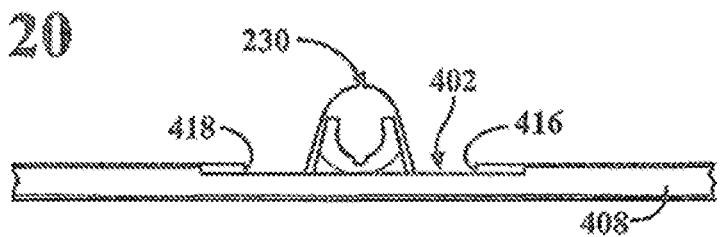
FIG. 20 is a partial side-elevational view of the cleaning head shown in FIG. 19.
Figure 21:
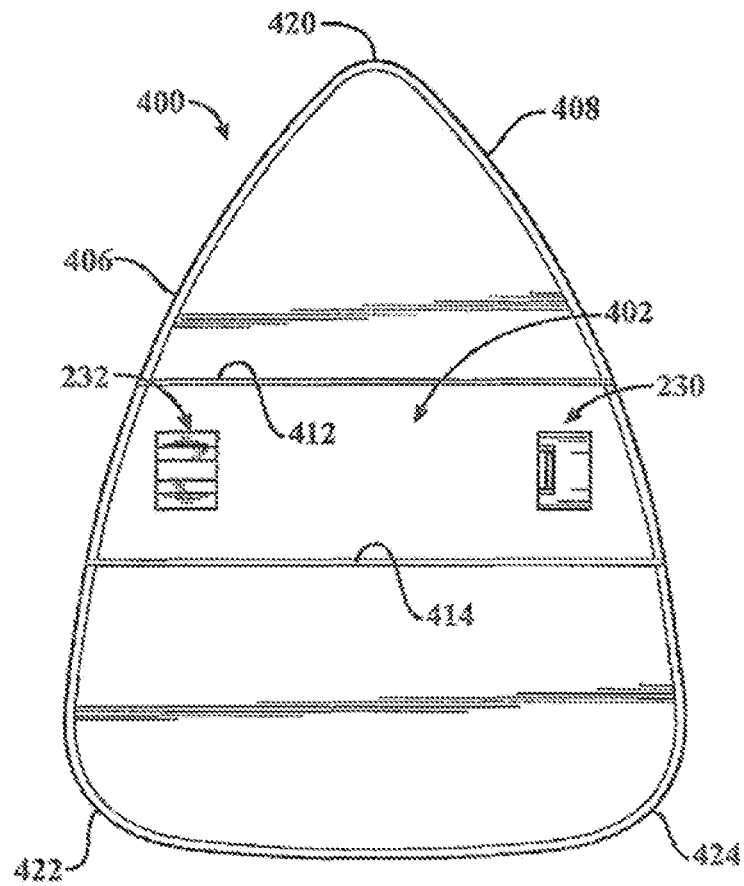
FIG. 21 is a plan view of another aspect of a cleaning head.
Figure 22:
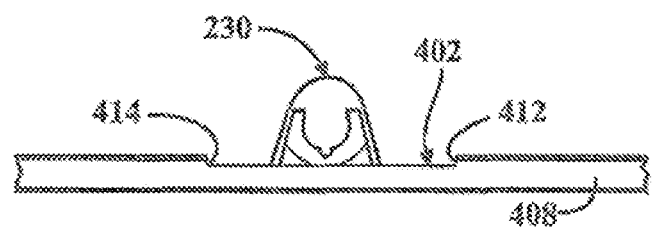
FIG. 22 is a partial side elevational view of the cleaning head shown in FIG. 21.

Other aspects of a cleaning apparatus are shown in FIGS. 19-22. In this configuration, a cleaning head 400 has a peripheral lip; but lacks the notch in the bottom surface of the lip shown in the related current cleaning apparatus shown in FIGS. 1-9. In this aspect, an enlarged notch 402 is formed in the top surface 404 of the cleaning head 400 generally extending laterally between two opposed side edges 406, 408 of the cleaning head 400. The notch 402 may have generally linear sidewalls 412, 414 as shown in FIGS. 21, 22 or more arcuate shaped sidewalls 416, 418 or a combination of arcuate ends and linear center portions as shown in FIGS. 19, 20.

For example, the cleaning head 400 may have a generally ⅛th inch thickness from tip end 420 to the opposed ends 422, 424. The notch 402 is 1/16th inch deep thereby rendering the center portion of the cleaning head 400 underlying the notch 402 only 1/16th inch thick. This adds increased flexibility to the cleaning head 400 while maintaining a maximum cleaning head thickness of ⅛th inch at the tip end 420 and the opposed corner ends 422, 424.

This cleaning head 400 configuration eliminates warping and improves structural integrity of the cleaning head 400 as compared to prior art cleaning heads which typically had a 1/16th inch thickness which is prone to warping. The notch 402 extending generally centrally and laterally across the top surface 404 of the cleaning head 400 not only increases flexibility of the cleaning head when the concave bottom surface of the cleaning head 400 is brought into flat, constant surface engagement with the glass or other surface to be cleaned; but also provides a maximum thickness of ⅛th inch at the forward and rearward ends of the cleaning head 400 to both resist warping as well as to maintain the tip end 420 and the opposed corner edges 422 and 424 in contact with the underlying surface to be cleaned.

In applicant's prior cleaning apparatus disclosed in U.S. Pat. Nos. 7,213,684 and 6,795,999 and shown in FIG. 1, the tip 228 of the paddle 220 had a small radius, smoothly curved shape formed at about a ¾ inch or 19.05 mm. radius.

Figure 23:
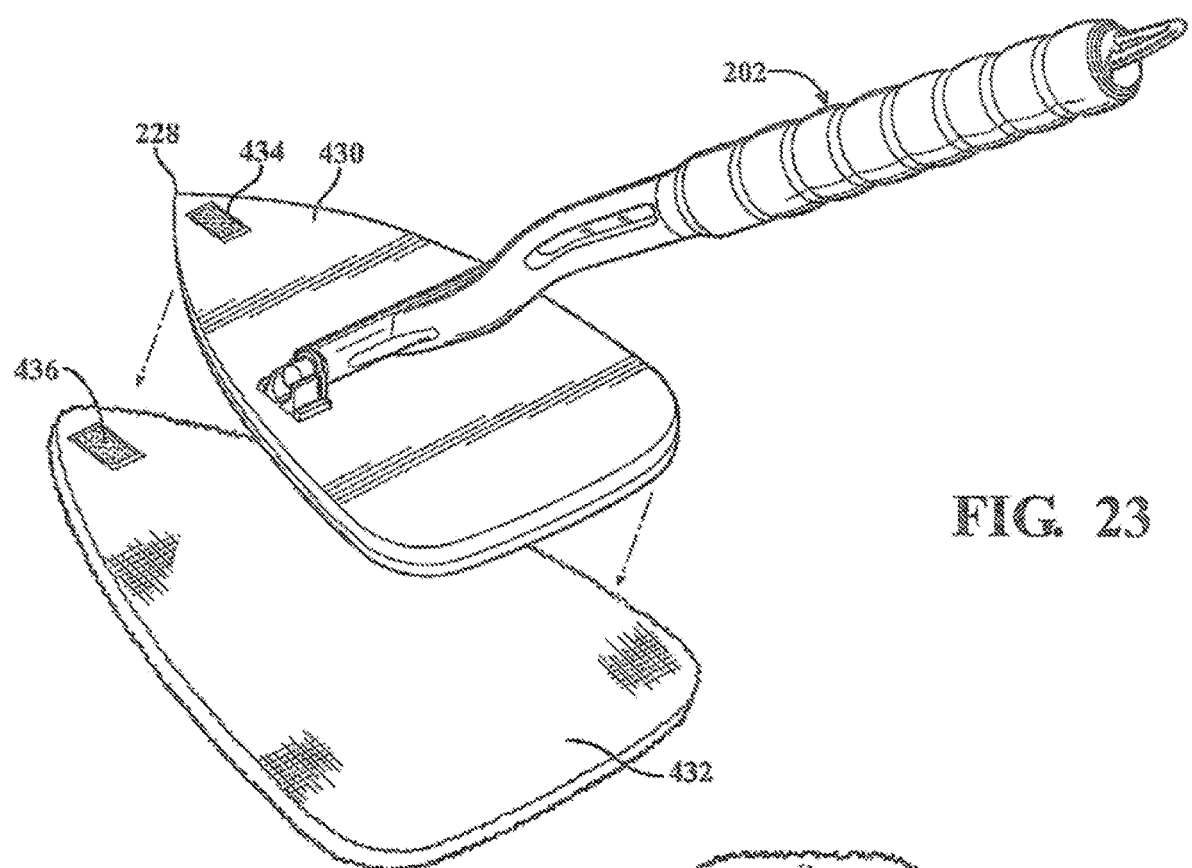
FIG. 23 is an exploded perspective view of another aspect of a cleaning apparatus with a narrow range radius tip.

In some uses, this prior smoothly rounded tip 228 limits the ability of the cleaning head or paddle 220 to fully engage in cleaning tight corners of a window or surface, since a frame surrounding the window or surface may have a 90° corner. To overcome this issue, the tip 228, FIGS. 23 and 24 of the present paddle 220, is formed with a radius of between about 1.0 mm to less than 19.05 mm. This creates a more sharply formed tip 228 ideal for fully engaging a tight 90° corner of a frame at a corner of a window or other surface being cleaned.

The use of separable fasteners acts as a secondary attachment of a cleaning element 432 to the paddle 430. It is implemented as a "fail safe" attachment to ensure that the primary attachment means of the open cell foam construction of the cleaning head 430 with the woven fiber construction of the cleaning element 432 works at maximum performance.

It will be understood that one or more separable fasteners 434 and 436 may be provided at the tip end 228 of the cleaning element 432 and the cleaning head 430. Alternately, secondary attachments using similar releasable fasteners may be provided at the opposite corners of the cleaning head 430 and cleaning element 432.

In applicant's prior cleaning apparatus, the cleaning element was in the form of a bonnet having an elastic band at the outer edges to hold the cleaning element around the paddle as well as providing an inward tensile force drawing the cloth portion of the cleaning element smoothly across the pad on the paddle.

However, the elastic bonnet creates tension and force against the cleaning head or paddle and can pull up the edges of the cleaning head and thus decrease the effectiveness of the cleaning edges in corners of a window or other surface.

The attachment mechanisms described above involving a woven fiber generally flat sheet-like cleaning element 432 and the open cell construction of the pad allows many types of wipe materials to work with the cleaning head since the compression, friction and pressure generated by the cleaning head 430 as it pushes down on the work surface assists in holding all types of wipe materials in place on the paddle 220.

The sheet-like cleaning element 432 eliminates substantial product cost since the need for an elastic means to secure the current bonnet over the cleaning head or paddle is eliminated. In addition, the sheet like cleaning element 432 does not create any tension or negative force acting against the tip ends of the cleaning head 430 on the paddle. Thus, one hundred percent of the cleaning head surface remains in constant contact with the surface being cleaned.

Figure 25:
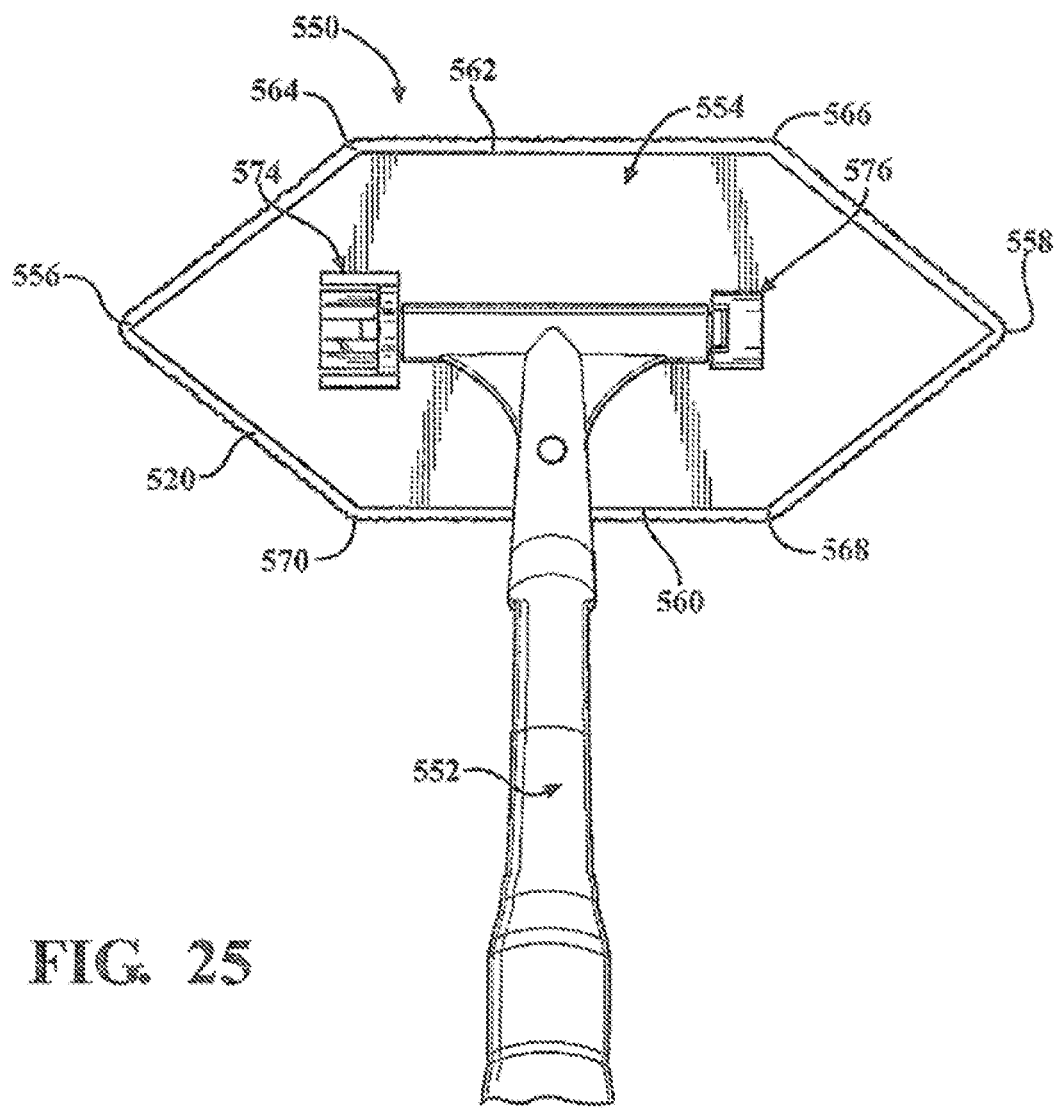
FIG. 25 is a plan view of another aspect of a cleaning apparatus.
Figure 26:
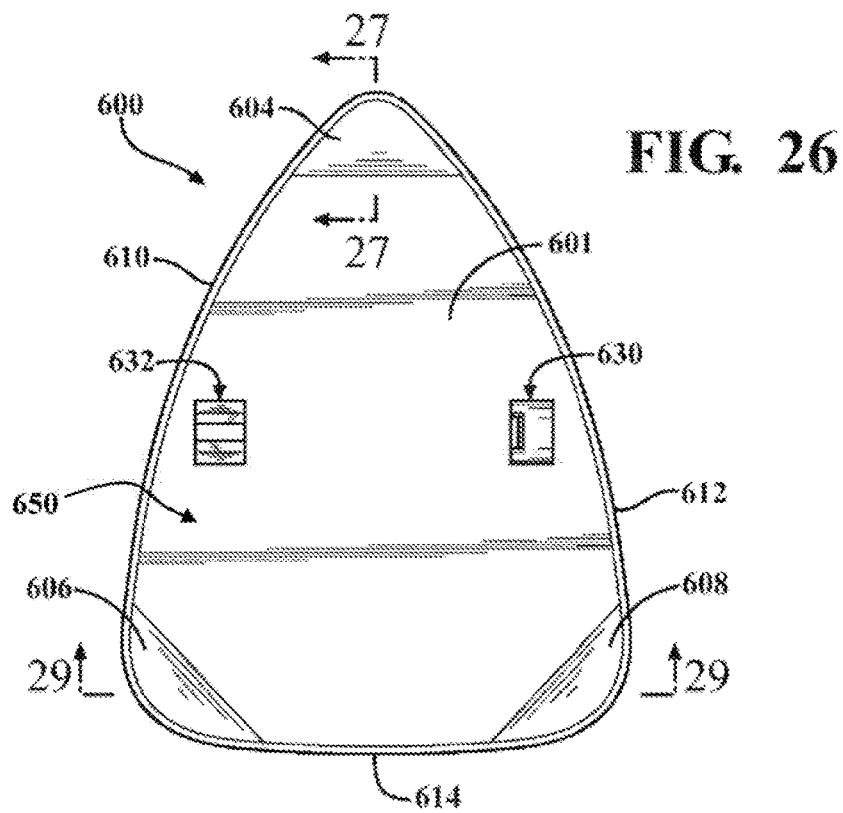
FIG. 26 is a plan view of another aspect of a cleaning apparatus.

Referring now to FIG. 25, there is depicted another aspect of a cleaning element 550 which uses some of the components and elements described previously in other aspects of the cleaning elements. In this aspect, the handle 552 has the same shape as the handle 202, except that it is has a reduced size since the cleaning head or paddle 554 is smaller than the cleaning head or paddle 220. The paddle 554 includes a peripheral edge 520.

The cleaning head 554 has a lateral length between opposed side tips 556 and 558 of approximately 6.0 inches, for example only. The cleaning head 554 has a width of approximately 3.0 inches between opposed sides 560 and 562, again for example only.

The cleaning head 554 has a plurality of sharp corners which form the tips 556 and 558 as well as interior corners 564, 566, 568 and 570. Any of the tips 556 and 558 or the interior corners 564, 566, 568 and 570 may be used to engage a corner of a surface being cleaned, such as the frame surrounding a window or mirror, etc. The tips 556 and 558, which can have the small radius sharp design described above for the tip 228 of approximately 1.0 mm to less than 19.05 mm, allow full insertion of the tips 556 and 558 into sharp corners of a frame surrounding a surface being cleaned.

The cleaning apparatus 550 also employs the open cell foam pad and woven fiber cleaning element or wipe described above.

The handle 552 is attached to the cleaning head or paddle 554 by means of the receivers 574 and 576 similar to the receivers 230 and 232, described above and the movable slide lock member 370.

Referring now to FIGS. 26-29, there is depicted another aspect of a cleaning apparatus 600. The cleaning apparatus 600 includes a cleaning head 601 substantially the same as that described above in FIG. 12A-D or 23. The cleaning head 601 includes a paddle 650. The cleaning head 601 includes receivers 630 and 632.

The cleaning head 601 has a downward, toward the head 601 bottom surface 602, formed tip 604 and corners 606, 608 and alternately side edges 610, 612, 614 extending from the more planar central portion of the cleaning head.

Figure 27:
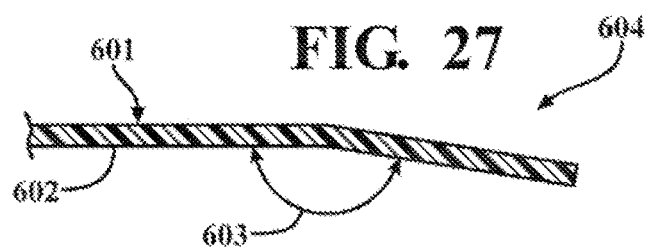
FIG. 27 is a cross-sectional view taken along lines 27-27 in FIG. 26.
Figure 28:
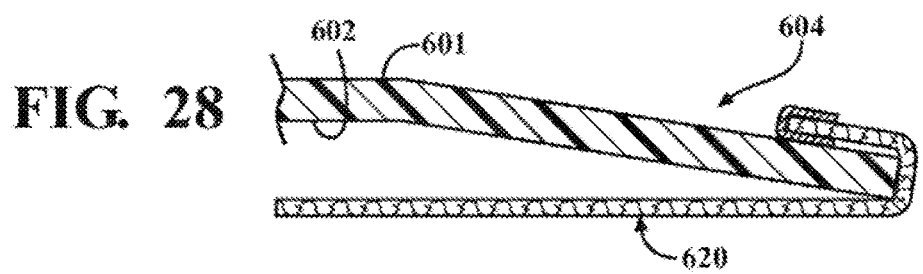
FIG. 28 is an alternate example of a cross-sectional view taken along lines 27-27 in FIG. 26 showing a cleaning element wrapped around the tip similar to that shown in FIG. 24.
Figure 29:
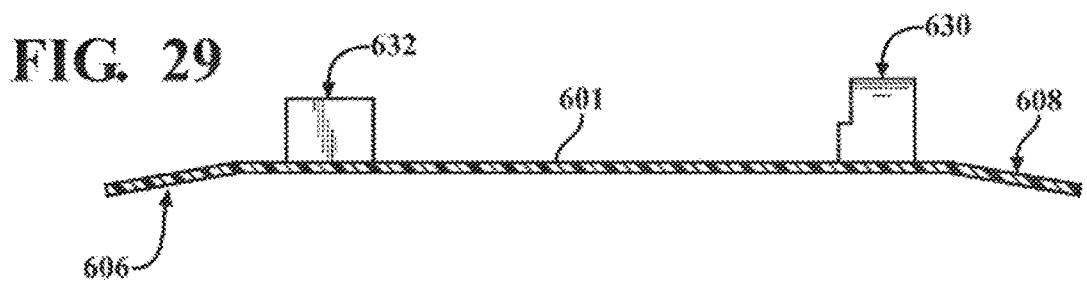
FIG. 29 is a cross-sectional view taken along lines 29-29 in FIG. 26.

In the example shown in FIGS. 27 and 28, the downward bent or formed tip 604 and corner ends 606, 608 shown in FIG. 29 or the side edges 610, 612, 614 (not shown) can be pre-formed to the desired downward angle 603 during the molding of the cleaning head 601 or bent after the head 601 has been formed.

For example, the tip 604 and opposed ends 606, 608 of the cleaning head 601 can be bent to a linear, obtuse angle 603 from the bottom surface 602 of the central portion of the cleaning head 601 as shown in FIG. 27. Alternately, the tip 604 and opposed ends 606, 608 may be bent in a downward direction away from the central portion 602 of the cleaning head 601 in a gradual radius or curve (not shown).

The length of the bent area of the tip 604 and the opposed ends 606, 608, or the side edges 610, 612, and 614, may vary from ½ to 1 inch in length from the outer edge of the cleaning head 601. It is understood that other lengths may be used.

As shown in a pre-use position prior to force being exerted through the handle to the cleaning head 601, the tip 604 and corners ends 606, 608 initially engage the surface to be cleaned. When downward force is exerted on the cleaning head 601 through the handle, the cleaning head 601 flattens in a normal manner thereby bringing the entire bottom surface 602 of the cleaning head 601 and the attached cleaning element 620 into contact with the surface to be cleaned. However, the downward bent tip 604, corner ends 606, 608, or side edges 610, 612, 614 exert an additional downward force on the peripheral edges, or the adjacent cleaning element surface in contact with the cleaning head peripheral edge, of the cleaning element thereby maintaining the cleaning element in contact with the surface to be cleaned despite any angular positioning of the cleaning head 600 over the surface to be cleaned.

Figure 24:
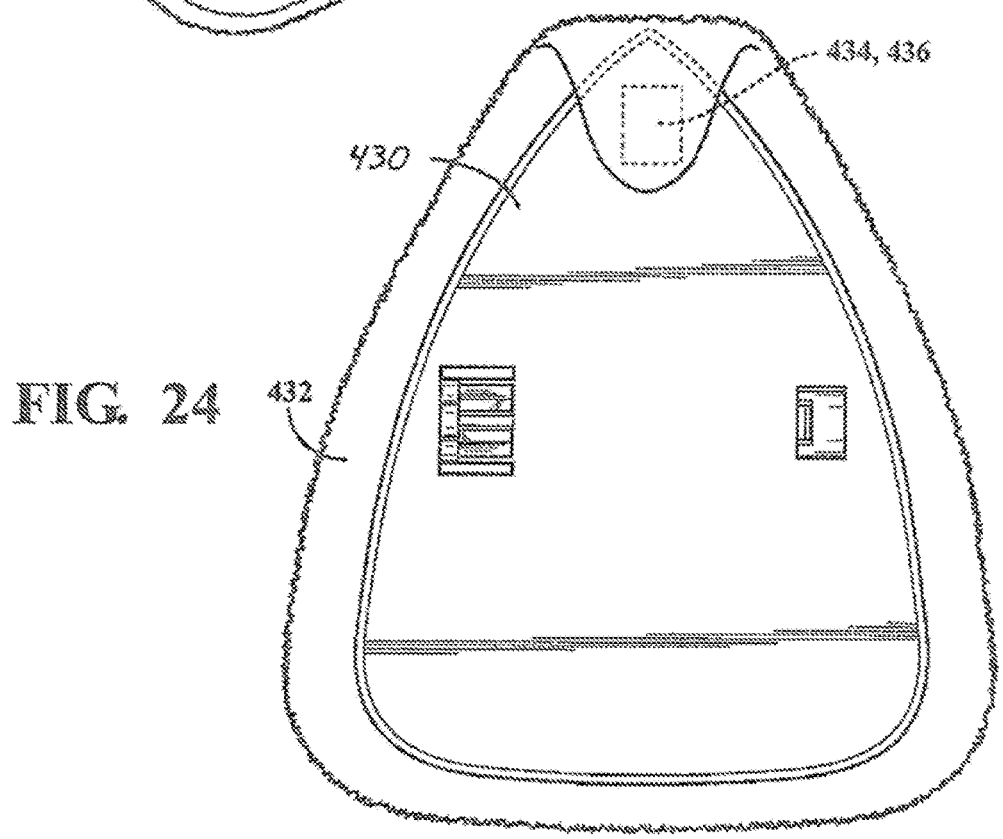
FIG. 24 is a partial, plan view of the cleaning apparatus shown in FIG. 23.

In one example (not shown), a compressive material substrate may be connected to the bottom surface 602 of head 601, for example as shown in FIG. 12C. It is further understood that cleaning element 620 may removably connect solely to the compressive material substrate and not wrap around tip 604 as shown in FIGS. 24 and 28 or other portions of head 601.

The invention claimed is:

1. A cleaning head comprising a paddle having:
   a) a central portion which is substantially planar;
   b) a tip end integral with and adjacent to the central portion;
   c) two opposed ends opposite the tip end, distanced from one another, and integral with and adjacent to the central portion;
   d) a top surface opposing a bottom surface, both the top surface and the bottom surface being part of the central portion, the tip end, and the two opposed ends;
   e) a peripheral edge defining a periphery of the paddle, including a plurality of side edges part of the central portion and which extend between the tip end and the opposed ends;
   wherein the peripheral edge, the top surface, and the bottom surface at the tip end and the two opposed ends angle downward relative to the plurality of side edges so that the tip end and the opposed ends of the cleaning head are positioned at a downward angle relative to the top surface and the bottom surface of the central portion; and
   wherein the downward angle of the tip end and the opposed ends is configured to generate downward force on the tip end and the opposed ends of the cleaning head when the cleaning head is engaged with a surface to be cleaned.

2. The cleaning head of claim 1, wherein the tip end and the two opposed ends of the cleaning head are positioned at a linear obtuse angle relative to both the bottom surface and the plurality of side edges of the central portion.

3. The cleaning head of claim 1, wherein tip end and the two opposed ends of the cleaning head are positioned at an arcuate downward bend relative to both the bottom surface and the plurality of side edges of the central portion.

4. The cleaning head of claim 1, wherein a compressive material substrate is adhered to the bottom surface of the paddle; and
   wherein the compressive material substrate is configured to releasably connect a cleaning element to the paddle such that the compressive material substrate is located between the cleaning element and the bottom surface of the paddle.

5. The cleaning head of claim 4, wherein the releasable connection of the cleaning element to the cleaning head is solely to the compressive material substrate.

6. The cleaning head of claim 4, wherein the compressive material substrate comprises a thickness less than 0.125 inches.

7. The cleaning head of claim 6, wherein the thickness of the compressive material substrate is between 0.001 to 0.1 inches.

8. The cleaning head of claim 4, wherein the cleaning head includes the cleaning element which is releasably connected to the compressive material substrate.

9. The cleaning head of claim 4, wherein the cleaning element comprises a woven fiber.

10. The cleaning head of claim 1, wherein the cleaning head has a thickness of 0.07 inches to approximately 0.25 inches, and wherein the thickness is a distance between the top surface and the bottom surface.

11. The cleaning head of claim 1 wherein the tip end and the opposed ends are 0.5 inches to 1.0 inches in length from the peripheral edge.

12. The cleaning head of claim 1, wherein the tip end is formed by the cleaning head narrowing to a sharp tip having a radius between about 1.0 mm and about 19.05 mm; and
wherein the tip end has a smaller radius than the opposed ends such that the tip end is sharper than the two opposed ends.

13. The cleaning head of claim 1, wherein the cleaning head includes a pair of receivers attached to the top surface and configured to pivotally attach to a handle.

14. A cleaning head comprising:
i) a paddle having:
  a) a central portion which is substantially planar;
  b) a tip end integral with and adjacent to the central portion;
  c) two opposed ends opposite the tip end, distanced from one another, and integral with and adjacent central portion;
  d) a top surface opposing a bottom surface, both the top surface and the bottom surface being part of the central portion, the tip end, and the two opposed ends;
  e) a peripheral edge defining a periphery of the paddle, including a plurality of side edges part of central portion and which extend between the tip end and the opposed ends;
  f) a thickness measured as a distance from the top surface to the bottom surface which is 0.07 inches to 0.25 inches;
ii) a substrate, which is a compressive substrate, adhered to the bottom surface of the paddle, wherein the substrate is configured to releasably connect a cleaning element to the paddle such that the substrate is located between the cleaning element and the bottom surface of the paddle;
  wherein the peripheral edge, the top surface, and the bottom surface at the tip end and the two opposed ends angle downward relative to the plurality of side edges so that the tip end and the opposed ends of the cleaning head are positioned at a downward angle relative to the top surface and the bottom surface of the central portion; and
  wherein the downward angle of the tip end and the opposed ends are operable to generate increased downward force on a surface to be cleaned when downward force is applied on the cleaning head toward the surface to be cleaned.

15. The cleaning head of claim 14, wherein the cleaning head includes
the cleaning element releasably connected to the substrate, the substrate the only connection of the cleaning element to the paddle.

16. The cleaning head of claim 14, wherein the substrate comprises a thickness less than 0.125 inches.

17. The cleaning head of claim 16, wherein the thickness of the substrate is between 0.001 to 0.1 inches.

18. The cleaning head of claim 14, wherein the tip end is formed by the cleaning head narrowing to a sharp tip having a radius between about 1.0 mm and about 19.05 mm; and
wherein the tip end has a smaller radius than the opposed ends such that the tip end is sharper than the two opposed ends.

19. The cleaning head of claim 14, wherein the cleaning head includes a pair of receivers attached to the top surface and configured to pivotally attach to a handle.

20. A cleaning head comprising:
i) a paddle having:
  a) a central portion which is substantially planar;
  b) a tip end integral with and adjacent to the central portion;
  c) two opposed ends opposite the tip end, distanced from one another, and integral with and adjacent to the central portion;
  d) a top surface opposing a bottom surface, both the top surface and the bottom surface being part of the central portion, the tip end, and the two opposed ends;
  e) a peripheral edge defining a periphery of the paddle, including a plurality of side edges part of the central portion and which extend between the tip end and the opposed ends;
ii) a substrate, which is a compressive material substrate, adhered to the bottom surface of the paddle, wherein the compressive material substrate is configured to releasably connect a cleaning element to the paddle such that the compressive material substrate is located between the cleaning element and the bottom surface of the paddle;
iii) the cleaning element which is releasably connected to the compressive material substrate;
  wherein the peripheral edge, the top surface, and the bottom surface at the tip end and the two opposed ends angle downward relative to the plurality of side edges so that the tip end and the opposed ends of the cleaning head are positioned at a downward angle relative to the top surface and the bottom surface of the central portion; and
  wherein the downward angle of the tip end and the opposed ends are operable to generate increased downward force on a surface to be cleaned when downward force is applied on the cleaning head toward the surface to be cleaned.

* * * * *